United States Patent [19]
Hansson

[11] Patent Number: 5,133,222
[45] Date of Patent: Jul. 28, 1992

[54] OPERATING MECHANISM FOR VEHICLES WITH AUTOMATIC TRANSMISSION

[75] Inventor: Lars Hansson, Angered, Sweden
[73] Assignee: AB Volvo, Sweden
[21] Appl. No.: 590,355
[22] Filed: Sep. 28, 1990

[30] Foreign Application Priority Data

Oct. 2, 1989 [SE] Sweden .................. 8903218

[51] Int. Cl.⁵ .................................. B60K 20/04
[52] U.S. Cl. .................. 74/477; 74/483 K; 192/4 A; 180/271
[58] Field of Search ........... 192/4 A; 74/477, 483 R, 74/483 K; 180/271

[56] References Cited

U.S. PATENT DOCUMENTS

| | | | |
|---|---|---|---|
| 3,570,320 | 3/1971 | MacAfee et al. | 74/473 |
| 4,614,256 | 9/1986 | Kuwayama et al. | 192/4 A |
| 4,727,967 | 3/1988 | Ogasawara et al. | 192/4 A |
| 4,880,092 | 11/1989 | Kito et al. | 74/878 X |
| 4,905,802 | 3/1990 | Gotoh | 192/4 A |
| 4,934,496 | 6/1990 | Barske et al. | 192/4 A |
| 4,947,967 | 8/1990 | Kito et al. | 192/4 A |
| 4,986,143 | 1/1991 | Livshits et al. | 74/878 |
| 4,991,700 | 2/1991 | Koga | 192/4 A |

FOREIGN PATENT DOCUMENTS 0324469 7/1989 European Pat. Off. .

*Primary Examiner*—Richard Lorence
*Assistant Examiner*—William O. Trousdell
*Attorney, Agent, or Firm*—Lerner, David, Littenberg, Krumholz & Mentlik

[57] ABSTRACT

The present invention relates to an operating mechanism for vehicles with automatic transmission, comprising a shift lever (1) which is moveable for selection of a desired shift lever position. A positioning means (7,8,9) interacts with a gate (10) so that the shift lever in at least one position is locked against movement if a control unit (7) is not activated. Further, the mechanism comprises a locking mechanism (15,16) which hinders said control unit (7) from being activated if a certain condition is not fullfilled, e.g. that the brake pedal has been depressed.

18 Claims, 6 Drawing Sheets

OPERATING MECHANISM FOR VEHICLES WITH AUTOMATIC TRANSMISSION

BACKGROUND OF THE INVENTION

This invention relates to an operating mechanism for vehicles with an automatic transmission, wherein the mechanism hinders the movement of the shift lever from the park position if certain conditions are not fulfilled.

Such mechanisms are already known. Accordingly, from DE-A-3 617 256, it is known to use an operating mechanism with a blocking device which in certain positions blocks said mechanism, thereby hindering the movement of the shift lever if certain conditions are not fulfilled. This known operating mechanism either locks in a park position (P) or in a neutral position (N). The condition which has to be fulfilled in order to unlock the shift lever, in either of these two positions, is that the brake pedal must be activated. An activation of the brake pedal causes a solenoid-actuated locking pin to be moved out of its locking position whereby the shift lever can be moved freely. The disadvantage with this known mechanism is that the blocking device directly locks the shift lever and that no further activation of, for example, a button is necessary in order to unlock the shift lever in connection with activation of the brake pedal. As a consequence, when checking if the shift lever is locked or not, the force is directly transmitted via the shift lever to the locking mechanism if in the locking positions. As the shift lever has a considerable length this will result in an undesired lever effect, which implies that the locking mechanism will be subjected to large forces. This locking mechanism and the shift lever therefore have to be dimensioned with respect to relatively large forces.

A known solution do the above-mentioned problem is shown in EP-A-300 268. This operating mechanism shows a blocking device which, when being moved from said locking position, requires activation of a button at the same time that the conditions of activating the brake pedal and switching on the ignition are fulfilled. When these latter conditions are fulfilled it is possible by activation of the button to move a locking pin which is mounted adjacent to the shift lever, down into the groove of a cage which is rotatably arranged on the shift lever. The rotation of said cage is performed, at least in one direction, by means of a solenoid whose position is controlled in response to whether the brake pedal is activated. This known device, however, has several disadvantages. Amongst others, all embodiments show a cage-like blocking device which is rotatably arranged on the outside of the shift lever. This design leads to relatively large surfaces between the blocking device and the shift lever being in contact, between which surfaces movement takes place. Accordingly, this can result in a relatively large frictional resistance and the design may be rather susceptible to influence of external particles which are friction-increasing. Therefore there is a risk that such a design would not work if such a negative influence occurred which would increase the frictional resistance to a level exceeding a certain predetermined force. The risk of such a malfunction is considered to be related to the size of said surface, partly because the frictional force is directly proportional to the relation of the contacting surfaces between two elements and partly because it can be assumed that the difficulty in keeping a component protected from the influence of external particles is, to a certain extent, related to the size of the surface.

A further disadvantage is that the known device has extra means, either in the form of spring or linkage devices, between the solenoid and the blocking device.

Moreover, this known device shows a blocking device which is rotated about an axis situated solely in the vertical plane. This implies that the known solution will not be able to make use of the gravitational force for moving/rotating the locking device.

From EP-A-324 469 there is known a further operating mechanism of a similar kind. This mechanism, however, has the major disadvantage that an intermediate device is pivotally mounted between the solenoid and the blocking device, which of course increases the complexity. A further disadvantage is that the blocking device is interconnected with the shift lever in such a manner that it moves together therewith.

OBJECT AND SUMMARY OF THE INVENTION

It is a first object of this invention to provide an operating mechanism, wherein the force is not directly transmitted via the shift lever to the locking mechanism, if in the locking position, when checking whether the shift lever is locked or not.

Another object is to create such a mechanism which is relatively unsusceptible to the influence of external particles and wherein the number of components is relatively low. It is of course desired to reduce the number of components for several reasons, e.g. cost and reliability.

Furthermore, the invention has as its object to achieve an operating mechanism with a locking device wherein the details have such a configuration that they can be produced in a rational manner.

Yet a further object of the invention is to create an operating mechanism of the above-mentioned kind which, if the power is cut off, after certain measures, enables said locking device to be released so that the shift lever, despite the power-cut, can be moved out of the park position.

Other objects will be apparent as the description progresses.

BRIEF DESCRIPTION OF THE DRAWINGS

In the following the invention will be described in more detail, by way of example only, with reference to the drawings in which.

DESCRIPTION OF PREFERRED EMBODIMENTS

Figure 1:
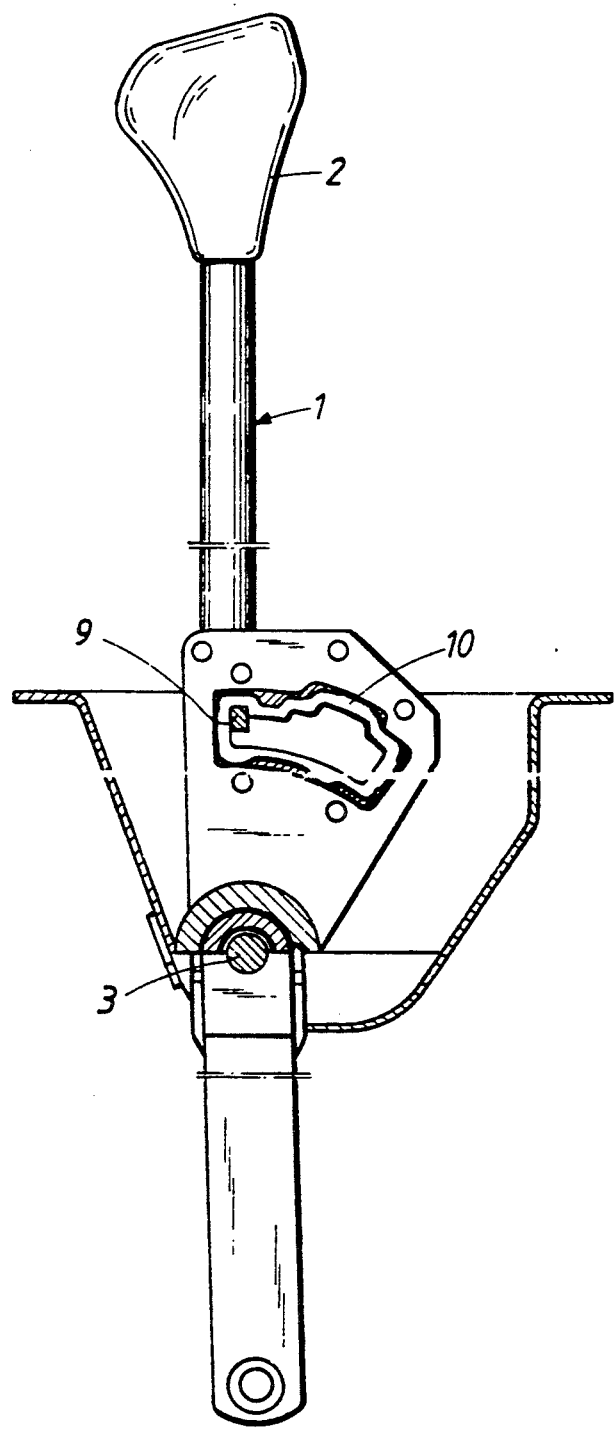
FIG. 1 is a side cross-sectional view showing a principal arrangement of an operating mechanism which is suited for being provided with the present invention.

FIG. 1 shows a shift lever 1 which is pivotally mounted about a shaft 3. On the opposite side of said shaft 3 are levers 4,14 which are interconnected with the transmission box. At the top of the shift lever 1 is a knob 2. On the knob 2 there is a button 7 which at least in a certain predetermined position of the shift lever has to be activated in order to permit movement of the shift lever out of said predetermined position.

The button 7 is connected to a rod 8 which extends within the tubular shift lever 1. At the lower end of the rod 8 there is a locking pin 9 which is transversely mounted in relation to the rod 8.

At one of the sides of the operating mechanism there is also arranged a gate 10, in which one end of the locking pin 9 is located. The gate 10 presents a number of vertical shoulders which for certain predetermined positions of the shift lever interact with the locking pin 9 in a blocking manner if the button 7 is not activated, i.e. pushed downwardly, since this button 7 is affected by an upwardly directed spring force.

Figure 2:
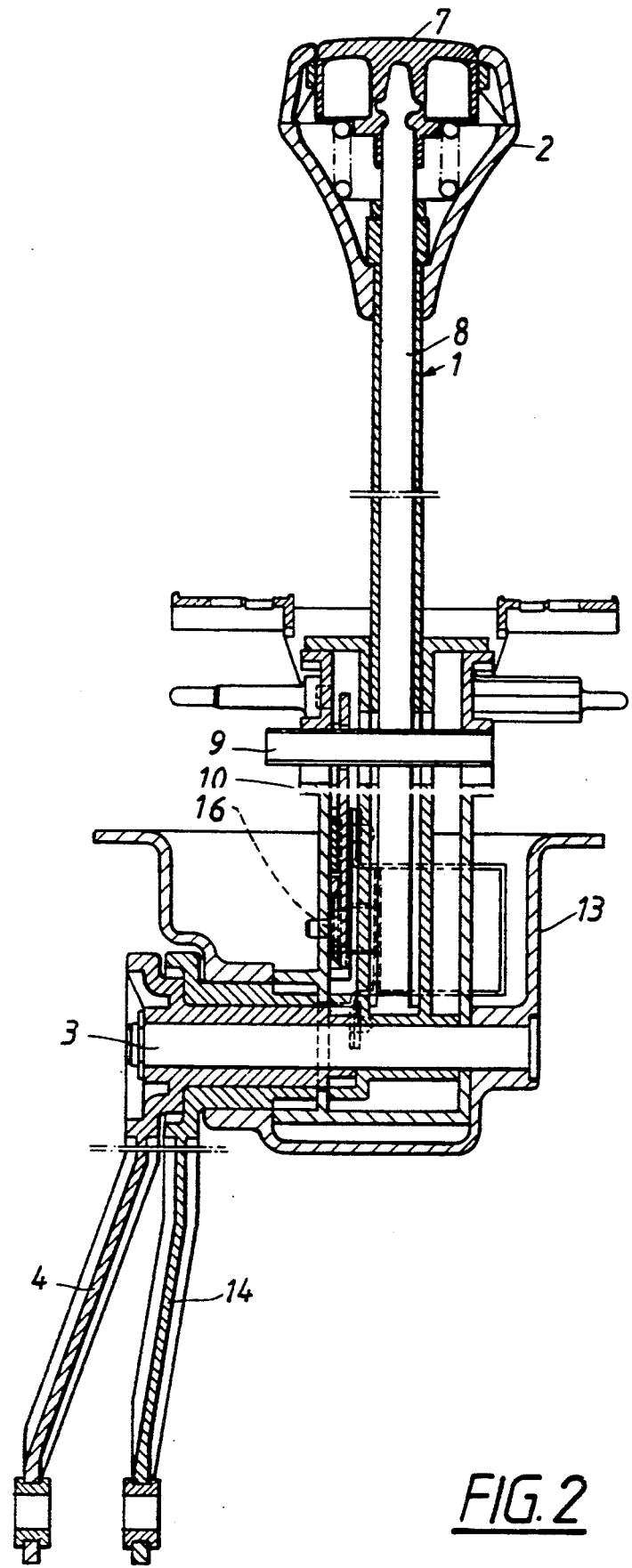
FIG. 2 shows the above mechanism seen from the front.

FIGS. 1 and 2 show the operating mechanism when the shift lever 1 is located in the park position. The locking pin 9 is then situated in an end position of the gate 10. To be able to move the car it is now required that the shift lever be differently positioned. This implies that the shift lever 1 has to be moved in a direction towards the other end of the gate 10, i.e. to the right-hand side of FIG. 1. The downwardly directed shoulder of the gate hinders the locking pin 9 against such a movement if the button 7 is not activated first, whereby the locking pin 9 is moved downwardly below said shoulder.

Figure 3:
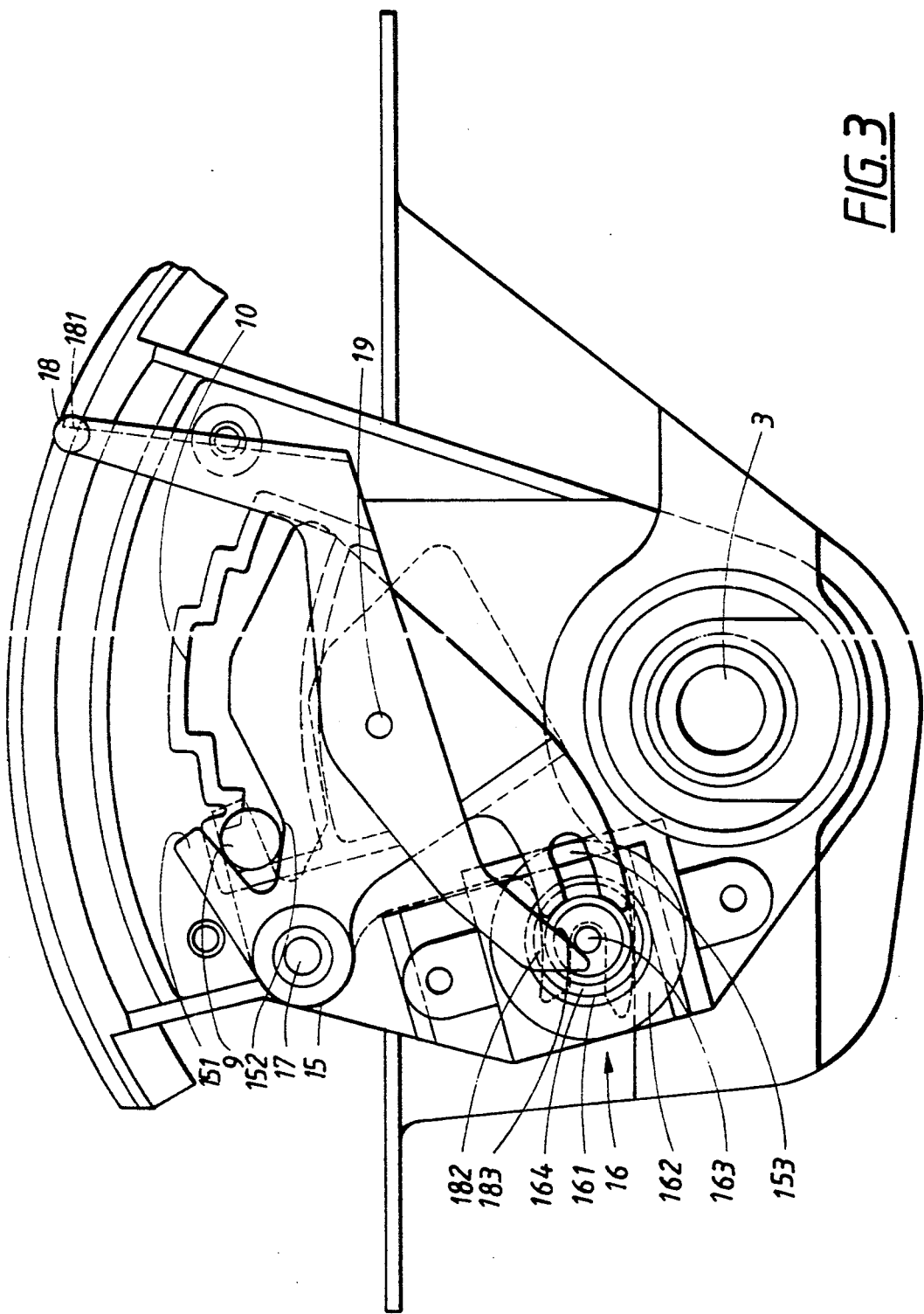
FIG. 3 is a side-view of chosen parts of the preferred embodiment of the invention.

FIG. 3 shows an operating mechanism according to FIGS. 1 and 2, which mechanism is arranged with a locking device 15, 16 in accordance with the invention. Also in this figure the locking pin 9 is shown in the park position of the gate 10. Further, there is a blocking device 15, which is rotatably mounted about a substantially horizontal shaft 17. This blocking device cooperates partly with the locking pin 9, and partly with a solenoid 16. The solenoid 16 comprises a moveable solenoid anchor 161 and a coil 162. On the end of the solenoid anchor 161 there is a protruding pin 163. The solenoid 16 is affected by the core with a force which acts in a direction coming out of the paper of FIG. 3. In FIG. 3 the solenoid anchor 161 is in a protruding position which prevents the blocking device 15 from being moved out of its first position (see also FIG. 4). In this first position an upwardly directed edge 152 of the blocking device 15 hinders a downwardly directed movement of the locking pin. Accordingly, it is not possible to depress the button 7 in this position. The solenoid 16 works in such a manner that when activated, it causes the solenoid anchor 161 to move inwardly as shown in FIG. 3 (see also FIG. 5).

In a preferred embodiment the solenoid 16 is interconnected with a relay which controls the brake light. Accordingly, when the ignition is on and the brake pedal is depressed the brake relay will be activated, resulting in an activation of the solenoid 16 and the solenoid anchor 161 is consequently moved inwardly into the coil 162. The solenoid anchor 161 hereby moves away from its locking position where it locks the blocking device 15 to a position where it releases the blocking device 15. As long as the brake is activated the solenoid anchor is maintained in this position where it releases the blocking device 15. Movement of the blocking device 15 is no longer hindered by the solenoid anchor 161. If the button 7 is activated in this state, this leads to a downward movement of the locking pin 9 and, accordingly, also a rotation of the blocking device 15 in a clockwise direction, which movement is directly controlled by the movement of the locking pin 9 since this, preferably with minor play, is positioned in a recess 157 formed between protruding side edges 151, 152, which are adapted to the configuration of the locking pin 9. After having completely depressed the button 7 and thereby rotated the blocking device 15, the shift lever 1 is released and can be moved.

When the shift lever 1 is repositioned in the park position, the locking pin 9 will be steered by the gate 10 and will enter into the recess 157 and thereby return the blocking device 15 to its first position by means of an upwardly directed force acting on the edge 151 of the blocking device. The solenoid anchor 161 can then be repositioned in its locking position.

The second end position of the blocking device is defined by the interaction between a recess 153 formed in the blocking device 15 and the pin 163 which protrudes from the solenoid anchor 161.

FIG. 3 shows that a releasing device 18 is rotatably arranged about a substantially horizontal pivot 19. This releasing device has an upper part 181 which is grippable and which, preferably, is positioned closely underneath the bristle-equipped opening for the shift lever 1. At the opposite side of its center of rotation 19 the releasing device 18 presents a protruding portion 182. This protruding portion 182 has a lower edge 183 which is tapered and which is intended to cooperate with a tapered part 164 of the solenoid anchor 161.

If there is a power-cut there is no possibility of activating the solenoid. Consequently, the blocking device 15 remains in its blocking position, where it blocks the locking pin 9, despite activation of the brake pedal and the button 7. Accordingly, it is difficult to move the car under such circumstances, since a mechanical arrangement (not shown) normally excludes the possibility of towing the car when the shift lever is positioned in the park position.

In order to also provide for the possibility of moving the car in an easy manner under these circumstances, the releasing device 18, in accordance with the invention functions as follows. The upper part 181 of the releasing device is gripped, preferably by introducing a finger through the bristle of the opening of the operating mechanism. Thereafter the releasing mechanism 18 is rotated in a counterclockwise direction by applying an upwardly directed force to the upper part 181. This force is transmitted to the oppositely positioned protruding portion 182 of the releasing mechanism 18. The lower, tapered edge 183 of the protruding portion 182 then interacts with the tapered edge 164 of the solenoid anchor 161. The more the releasing mechanism 18 is rotated, the more the solenoid anchor is pressed into the coil 162. Hence the solenoid anchor 161 is depressed. Thereafter the blocking device 15 can be pivoted out of its blocking position by means of depressing the button 7 and thereby moving the locking pin 9 out of its locking position in the gate 10. Consequently a different shift lever position can be chosen, e.g. the neutral position (N), in which the car can be moved.

Figure 4:
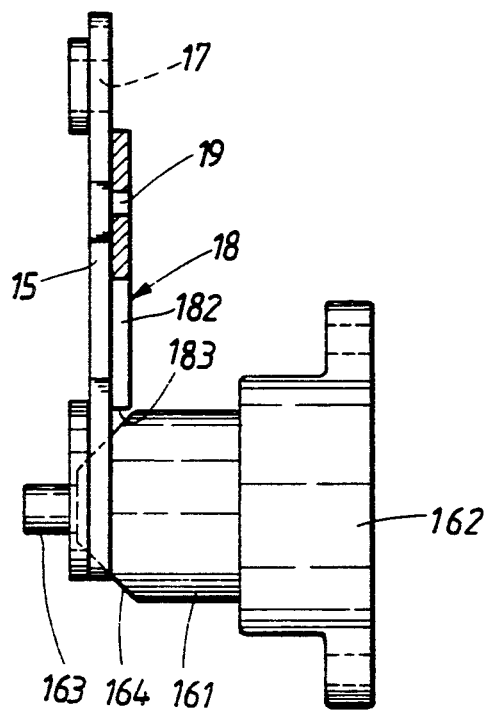
FIG. 4 is an enlarged partial side view which shows the locking device in a first position.

In FIG. 4 a side-view shows in greater detail the active position of the solenoid anchor 161 when this is located in that position where it locks the blocking device 15. Further, it is shown that the releasing mechanism 18 has its lower, tapered edge 183 located above the tapered portion 164 of the solenoid anchor.

Figure 5:
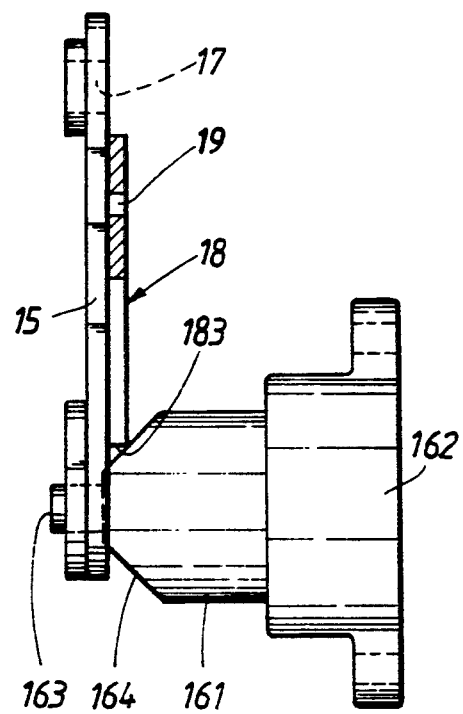
FIG. 5 is a view which shows the locking device in a second position.

In FIG. 5 the locking mechanism is shown in that position where it releases the blocking device 15. Normally, the solenoid anchor is moved into this non-locking position by activation of the brake pedal, which activation results in the solenoid anchor 161 being pulled into the coil 162. Thereafter the blocking device 15 can be rotated, together with the locking pin 9, into the releasing position, a position which is defined by means of a protruding pin 163 on the solenoid anchor 161.

FIG. 5 also shows that this position of the solenoid anchor 161, in which it releases the blocking device 15, can also be obtained after activation of the releasing mechanism 18, whereby the lower, tapered edge 183 of the protruding portion 182, by means of a camming action on the tapered part 164 of the solenoid anchor, can depress the anchor 161 into the coil 162.

Figure 6:
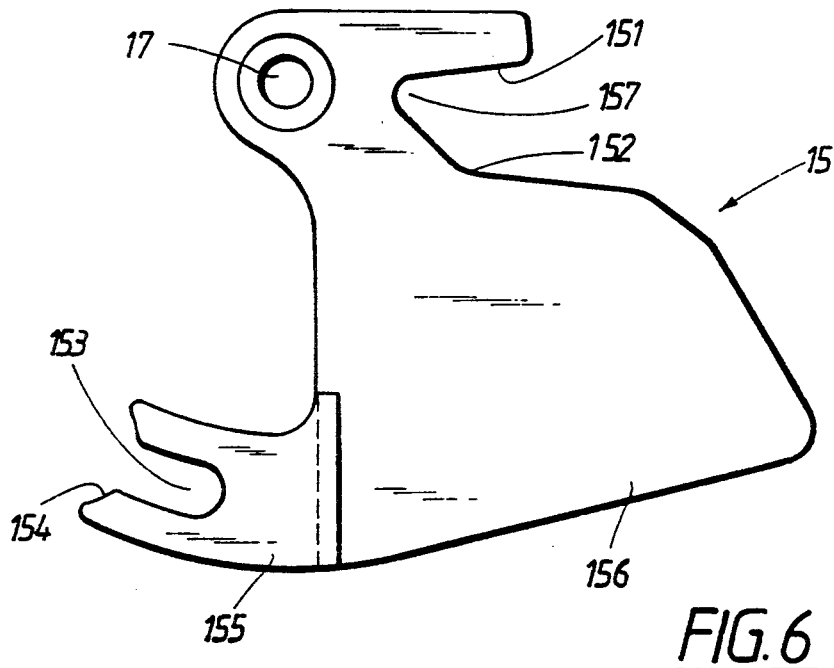
FIG. 6 shows a preferred embodiment of a locking device in accordance with the invention.

In FIG. 6 there is shown a drawing in detail of a preferred embodiment of the blocking device 15. It is shown that the blocking device 15 preferably consists of two elements 155, 156. One of the elements 156, which includes the pivot point 17, presents an edge 151 which interacts with the locking pin 9 in a manner described above. Further, this element 156 of the blocking device 15 presents a recess 157 in an area adjacent said edge 151, one side of the recess being defined by edge 151 and the opposite side of the recess being defined by an upwardly directed edge 152, of the main body of this element 156. The second element of the blocking device 15 is especially designed for interaction with the solenoid anchor 161. This element 155 is fitted to an edge portion of the other element 156 in an appropriate manner. This second element 155 partly consists of sub-surfaces 154 formed in an arc, the radius of which preferably corresponds to the radius of the solenoid anchor 161. Further, this second element 155 comprises a recess 153 which extends along an arc having a shape determined by the distance between the recess 153 and the center of rotation 17 of the blocking device 15. The prior mentioned surface 154 of this second element 155 defines the first position of said blocking device 15 and the inner end surface of said recess 153 defines the second position of the blocking device 15.

Figure 7:
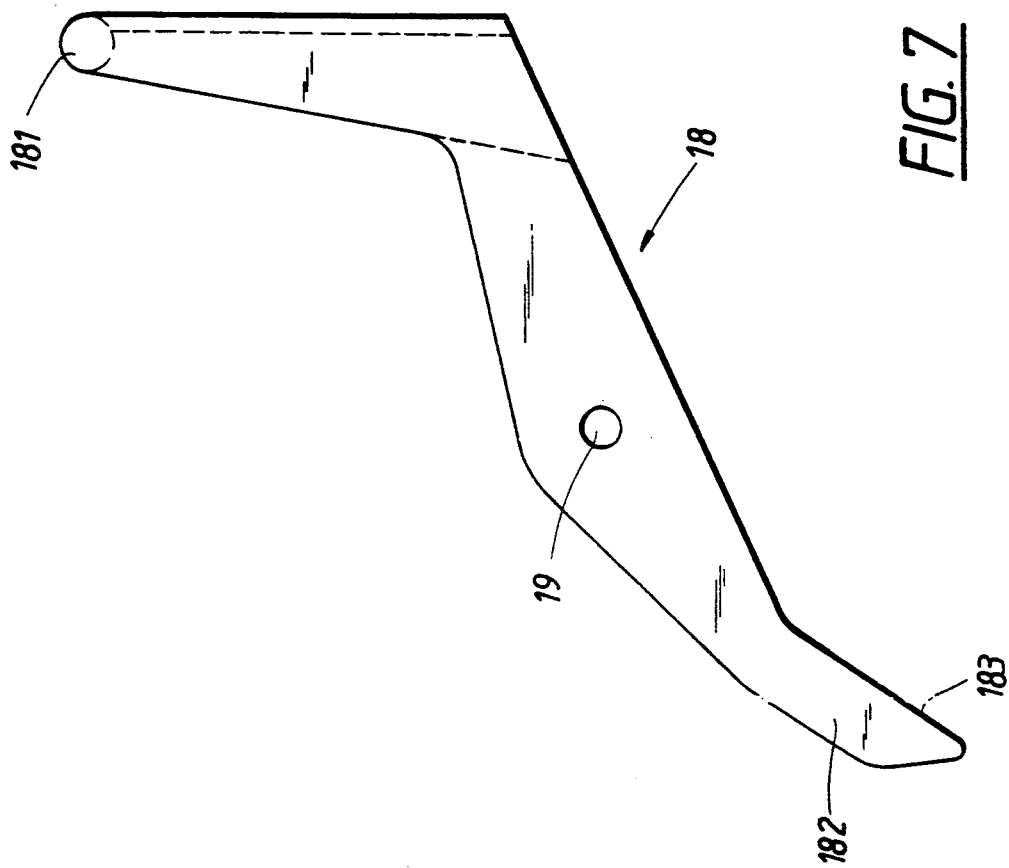
FIGS. 7,8 show a preferred embodiment of a releasing mechanism in accordance with the invention.
Figure 8:
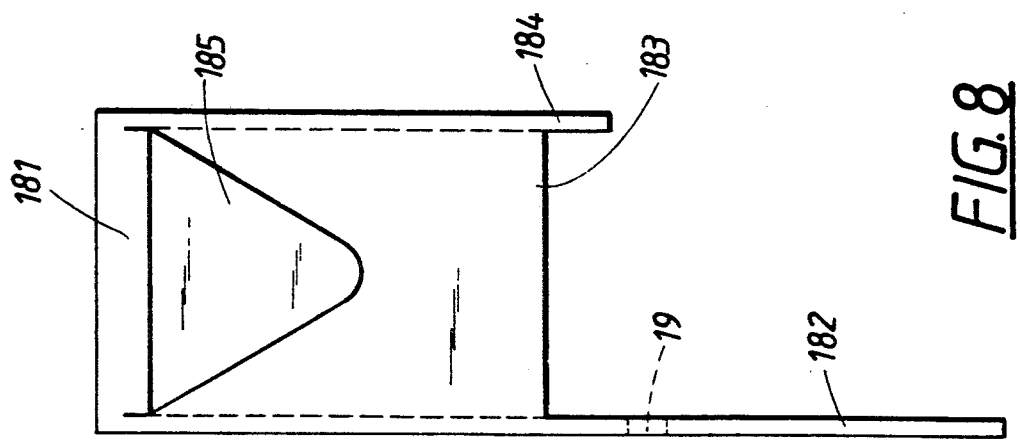

In FIG. 7 and 8 the release mechanism 18 is shown in more detail. It is shown that the release mechanism 18 comprises a plate-like element which comprises said protruding portion 182 and the pivot center 19, by means of which the release mechanism is arranged in a pivoting manner. On the opposite side of the pivot center 19 in relation to said protruding portion 182 there is a grippable part 181. This grippable part preferably consists of a device which is parallelly arranged in relation to the axis of pivot center 19. In order to provide a support for said device 181 there is at its other end a further plate-like element 184 and a spacer 183 therebetween having a recess 185. This recess 185 makes it possible to reach and grip the grippable device 181, e.g. with a finger.

Figure 9:
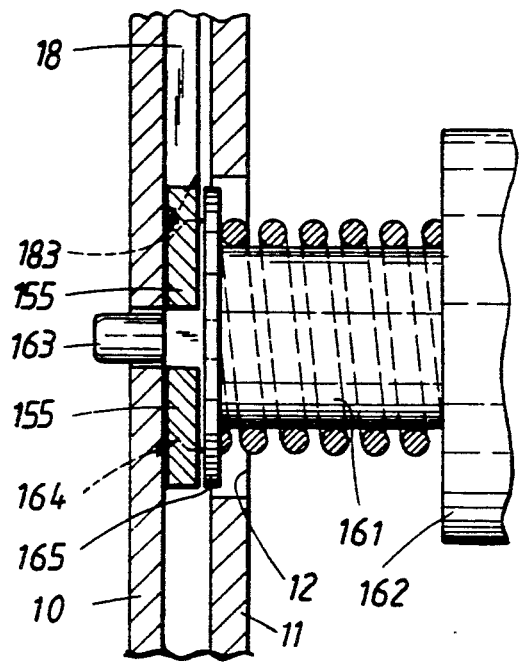
FIG. 9 shows a preferred embodiment of the locking device in its first position.
Figure 10:
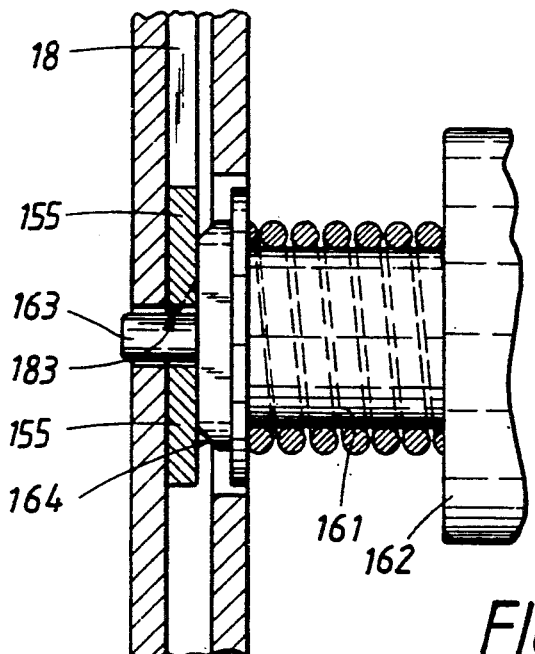
FIG. 10 is a view which shows the second position of the preferred locking device of FIG. 9.

FIG. 9 and 10 show principally the same subject-matter as FIG. 4 and 5. The embodiment according to FIG. 9 and 10, however, is more preferred. Firstly, it is shown that the plate 10 which includes the gate is also used as a means for centering the solenoid anchor 161 by means of its pin 163 which is moveable in a hole in said plate 10. Further, the solenoid anchor 161 has a flange 165 which interacts with a protruding edge 12 when the solenoid is in its retracted position. In its protruding position, which is shown in FIG. 9, the limit is defined by the inner surface of the wall 10. Moreover it is shown that both the release mechanism 18 and the front portion 155 of the blocking device are located in the same plane and that the release mechanism 18 and the blocking device 15 are positioned between two walls 10,11 in order to obtain exact steering thereof. The principal manner of function is the same as has been described in connection with FIG. 4 and 5. A small difference, however, is to be found. Since both the front part 155 of the blocking device and the release mechanism 18 are located in the same plane, the release mechanism 18 is pushed away when the button 7 is activated and the front part 155 of the blocking device is then moved towards that position where the protruding portion 182 of the release mechanism was situated.

The invention is not limited by what has been presented by the above described preferred embodiments, but can be varied within the scope of the following claims.

Hence, it is for example not necessary to have a rod for transmitting the force from the button 7 to the locking pin 9, but it is also possible to use a wire which runs about a wheel, in order to obtain the same movement. Other possible changes could be to supply the operating mechanism with several corresponding blocking devices or to adapt one and the same blocking device to block the pin in two different positions.

Further, it is possible to equip the side of the blocking device 15 with surfaces 151,152 interacting with the locking pin 9 instead of a recess 157 in the blocking device 15, e.g. by means of welding a horseshoe-like part on it at the location where the recess should be placed.

I claim:

1. An operating mechanism for a vehicle having an automatic transmission comprising,
   a shift lever operatively connected to said automatic transmission and displaceable about a pivot axis among a plurality of positions,
   shift plate means associated with said shift lever and defining said plurality of positions,
   locking means connected to said shift lever and adapted in a first position in at least one predetermined position of said shift lever to engage said shift plate means and thereby prevent displacement of said shift lever from said predetermined position to another of said plurality of positions, said locking means adapted in a second position to disengage said shift plate means and thereby release said shift lever for displacement,
   control means operatively connected to said locking means for displacing said locking means from said first position to said second position,
   blocking means pivotally mounted about an axis which is substantially parallel to said pivot axis and moveable between a retaining position for retaining said locking means in said first position for retaining said locking means in said first position when said shift lever is in said predetermined position and a release position for releasing said locking means for displacement to said second position, and
   reciprocating means adapted in a first position to prevent the movement of said blocking means in a first direction from said retaining position to said release position and adapted in second position to release said blocking means for movement in said first direction, said reciprocating means having a first side facing generally toward said blocking means and a second side facing generally away from said blocking means, only said first side of said reciprocating means abutting said blocking means in said first position, said blocking means including engagement means for engagement with said locking means at least in said predetermined position of said shift lever whereby displacement of said locking means from said first position to said second position pivots said blocking means from said retaining position to said release position.

2. The operating mechanism as claimed in claim 1, wherein said engagement means includes two opposed surfaces spaced apart by a predetermined dimension.

3. The operating mechanism as claimed in claim 2 wherein said locking means comprises a pin having a predetermined diameter which is slightly less than said predetermined dimension.

4. The operating mechanism as claimed in claim 2 wherein said engagement means comprises a recess formed in said blocking means.

5. The operating mechanism as claimed in claim 1 wherein said blocking means comprises a plate-like device.

6. The operating mechanism as claimed in claim 1 wherein said blocking means includes a return edge for engagement with said locking means in at least said predetermined position of said shift lever whereby displacement of said locking means from said second position to said first position pivotally displaces said blocking means from said release position to said retaining position.

7. The operating mechanism as claimed in claim 1 wherein said blocking means includes a slot and said reciprocating means includes a protruding member which is disposed in said slot in said release position.

8. The operating mechanism as claimed in claim 1 further comprising a release mechanism for contacting said reciprocating means and forcing said reciprocating means from said first position to said second position.

9. The operating mechanism as claimed in claim 1 wherein said reciprocating means comprises a piston actuated between said first and second positions by a solenoid.

10. The operating mechanism as claimed in claim 9 wherein said blocking means includes a slot and said piston includes a protruding member which is disposed in said slot in said release position.

11. The operating mechanism as claimed in claim 9 wherein said piston occupies said first position when said solenoid is in a non-activated state.

12. The operating mechanism as claimed in claim 11 further comprising a release mechanism for contacting said piston and forcing said piston from said first position to said second position.

13. An operating mechanism for a vehicle having an automatic transmission comprising, a shift lever operatively connected to said automatic transmission and displaceable about a pivot axis among a plurality of positions, shift plate means associated with said shift lever and defining said plurality of positions, locking means connected to said shift lever and adapted in a first position in at least one predetermined position of said shift lever to engage said shift plate means and thereby prevent displacement of said shift lever from said predetermined position to another of said plurality of positions, said locking means adapted in a second position to disengage said shift plate means and thereby release said shift lever for displacement, control means operatively connected to said locking means for displacing said locking means from said first position to said second position, blocking means pivotally mounted about an axis which is substantially parallel to said pivot axis and moveable in a path between a retaining position for retaining said locking means in said first position when said shift lever is in said predetermined position and a release position for releasing said locking means for displacement to said second position, and reciprocating means having a first diameter and a second diameter larger than said first diameter, said second diameter adapted in a first position of said reciprocating means to prevent the movement of said blocking means in a first direction from said retaining position to said release position and adapted in a second position of said reciprocating means to release said blocking means for movement in said first direction, said second diameter having a first side facing generally toward said blocking means and a second side facing generally away from said blocking means, only said first side of said second diameter abutting said blocking means in said first position, and said first diameter adapted to intersect said path and define said release position in said second position of said reciprocating means, said blocking means including engagement means for engagement with said locking means at least in said predetermined position of said shift lever whereby displacement of said locking means from said first position to said second position pivots said blocking means from said retaining position to said release position.

14. The operating mechanism as claimed in claim 13 wherein said blocking means includes a slot and said first diameter of said reciprocating means is disposed in said slot in said release position.

15. The operating mechanism as claimed in claim 13 wherein said reciprocating means is actuated between said first and second positions by a solenoid.

16. The operating mechanism as claimed in claim 13 wherein said reciprocating means occupies said first position when said solenoid is in a non-activated state.

17. The operating mechanism as claimed in claim 13 wherein said reciprocating means further comprises a tapered surface between said first and second diameters.

18. The operating mechanism as claimed in claim 17 further comprising a release mechanism for contacting said tapered surface and forcing said reciprocating means from said first position to said second position.

* * * * *

UNITED STATES PATENT AND TRADEMARK OFFICE
CERTIFICATE OF CORRECTION

PATENT NO. : 5,133,222
DATED : July 28, 1992
INVENTOR(S) : Lars Hansson

It is certified that error appears in the above-indentified patent and that said Letters Patent is hereby corrected as shown below:

```
Title page, item [54], line 2, and col. 1, line 2, after "WITH" insert
 --AN--.
Column 1, line 31, "positions" should read --position--.
Column 1, line 37, "do" should read --to--.
Column 2, line 55, "a" should read --an enlarged partial--.
Column 3, line 47, "core" should read --coil--.
Column 6, lines 61 thru 62, delete "said locking means in said
first position for retaining".
```

Signed and Sealed this

Twenty-fourth Day of August, 1993

*Attest:*

BRUCE LEHMAN

*Attesting Officer*     Commissioner of Patents and Trademarks